US012771784B2

(12) United States Patent
Shimizu

(10) Patent No.: US 12,771,784 B2
(45) Date of Patent: Oct. 20, 2026

(54) GATEWAY APPARATUS, PRIVATE BRANCH EXCHANGE SYSTEM, AND PRIVATE BRANCH EXCHANGE METHOD

(71) Applicant: NEC Platforms, Ltd., Kawasaki (JP)

(72) Inventor: Yosuke Shimizu, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 136 days.

(21) Appl. No.: 18/867,086

(22) PCT Filed: Jun. 6, 2023

(86) PCT No.: PCT/JP2023/020949
§ 371 (c)(1),
(2) Date: Nov. 19, 2024

(87) PCT Pub. No.: WO2023/238848
PCT Pub. Date: Dec. 14, 2023

(65) Prior Publication Data

US 2025/0310437 A1 Oct. 2, 2025

(30) Foreign Application Priority Data

Jun. 7, 2022 (JP) ................................ 2022-092223

(51) Int. Cl.
*H04M 3/42* (2006.01)
*H04M 7/00* (2006.01)

(52) U.S. Cl.
CPC ....... *H04M 3/42093* (2013.01); *H04M 7/009* (2013.01)

(58) Field of Classification Search
CPC ...... H04M 3/42093; H04M 3/42; H04M 3/54; H04M 7/009; H04M 3/50; H04Q 3/60
(Continued)

(56) References Cited

U.S. PATENT DOCUMENTS

2009/0067609 A1* 3/2009 Handa ...................... H04M 3/48 379/221.14
2022/0247600 A1* 8/2022 Anderson ............... H04L 12/66

FOREIGN PATENT DOCUMENTS

JP 2010-087656 A 4/2010
JP 2015-029190 A 2/2015
(Continued)

OTHER PUBLICATIONS

International Search Report for PCT Application No. PCT/JP2023/020949, mailed on Aug. 29, 2023.

*Primary Examiner* — Maria El-Zoobi
(74) *Attorney, Agent, or Firm* — Sughrue Mion, P.LLC.

(57) ABSTRACT

A gateway apparatus provided on communication path between private branch exchanger and cloud PBX, wherein the private branch exchanger has function of performing other party response notification to subordinate terminal when representative incoming call is made in response to call made from external telephone, wherein the cloud PBX has function of virtually performing private branch exchange for subordinate terminal on cloud, and wherein the gateway apparatus comprises: parameter analysis part configured to receive and analyze response parameter(s) related to other party response notification from the private branch exchanger via first API; message generation part configured to generate message based on analysis result of the parameter analysis part; and message transmission part configured to transmit the message generated by the message generation part to the cloud PBX via second API different from the first API.

13 Claims, 8 Drawing Sheets

(58) Field of Classification Search
USPC .................................................... 379/142.06
See application file for complete search history.

(56) References Cited

FOREIGN PATENT DOCUMENTS

| | | | |
|---|---|---|---|
| JP | 2016-029782 | A | 3/2016 |
| JP | 2016-086232 | A | 5/2016 |
| JP | 2019-115005 | A | 7/2019 |
| JP | 2021-027424 | A | 2/2021 |
| JP | 2022-044448 | A | 3/2022 |

* cited by examiner

[EXAMPLE OF DISPLAY ON PERSONAL COMPUTER OR SMARTPHONE]

※ RESPONSE PARAMETERS ARE DISPLAYED AS CHAT MESSAGES

FIG. 3

[EXAMPLE OF DISPLAYS ON FIXED PHONES]

| | | |
|---|---|---|
| OTHER PARTY RESPONSE | 12-10 10:13 | 0312345678 |
| CALL NOT RESPONDED | 12-10 10:20 | 0412345678 |

※ OTHER PARTY RESPONSE NOTIFICATION IS DISPLAYED IN INCOMING CALL HISTORY

FIG. 4

[DATABASE]

| EXTENSION NUMBER | USER-NAME | MAIL ADDRESS |
|---|---|---|
| 100 | TANAKA TARO | tanakat@xxx.xxx |
| 101 | SUZUKI JIRO | suzukij@xxx.xxx |
| 200 | TANAKA TARO | tanakat@xxx.xxx |
| 201 | SUZUKI JIRO | suzukij@xxx.xxx |

[COMPARATIVE EXAMPLE]

GATEWAY APPARATUS, PRIVATE BRANCH EXCHANGE SYSTEM, AND PRIVATE BRANCH EXCHANGE METHOD

CROSS REFERENCE TO RELATED APPLICATION

The present invention is based on the priority claim of Japanese Patent Application No. 2022-092223 (filed Jun. 7, 2022), the entire contents of which are incorporated herein by reference.

The present invention relates to a gateway apparatus, a private branch exchange system, and a private branch exchange method.

BACKGROUND

A private branch exchanger (non-cloud PBX; Private Branch eXchanger) connected to a public switched telephone network to provide an internal line switching function and an external line connection function for a large number of terminals (such as fixed phones) comprises a function (other party response notification function) of allowing users to be notified who responded a representative incoming call from an external telephone (other party response) or no one responded (call abandonment), and it is used by many users (refer to, for example, Patent Literature (PTL) 1. The private branch exchanger is equipped with TAPI (Telephony Application Programming Interface), and can transmit and receive other party response notification data to and from the external via TAPI.

Further, a cloud PBX putting a private branch exchanger on a cloud has been practical use in recent years, and it has become possible to provide internal line exchange functions and external line connection functions for terminals (personal computers, smartphones, tablet terminals, etc.) from a cloud server through the Internet. The cloud PBX is equipped with a REST API (RESTful Application Programming Interface) to allow chat message(s) that cannot be used at the non-cloud private branch exchanger to be sent and received externally via the REST API.

[PTL 1] Japanese Patent Kokai Publication No. JP2010-087656A

SUMMARY

The following analysis is provided by the present inventor.

In recent years, number of users working remotely has increased, while the use of fixed phones has decreased, the number of users using terminals such as smartphones and personal computers has increased. It is important for users working remotely to be notified how other users responded representative incoming calls. If the other party response notification function of the private branch exchange could be used in the cloud PBX, it would be possible to be notified who responded the representative incoming call to confirm the response content with the user who responded the call. Therefore, a hybrid system can be considered in which a private branch exchanger and a cloud PBX respectively operating independently are combined to operate as a single private branch exchanger (refer to FIG. 6). According to the hybrid system, terminals subordinate of the private branch exchanger and the same terminals subordinate of the cloud PBX will ring in response to representative incoming calls to enable talking.

However, in the hybrid system, since an API (Application Programming Interface) supported by the private branch exchanger and an API supported by the cloud PBX are different from each other, data communication performed with the private branch exchanger's API cannot be performed by the cloud PBX. That is, while the private branch exchanger's other party response notification function can be utilized with fixed phones subordinate of the private branch exchanger, the cloud PBX does not support an API for receiving data of the private branch exchanger's other party response notification function. As the result, the private branch exchanger's other party response notification function cannot be utilized with the terminals subordinate of the cloud PBX, and users using terminals subordinate of the cloud PBX must verify the other users what action has been taken on the representative incoming call, and it takes time to verify.

Further, in the hybrid system, when a call is not responded, a callback can be made, however, when a call is responded, any user other than one who responded the call cannot know whether or not the call is responded, which may result in missing business opportunities.

Furthermore, in the hybrid system, when the API for performing other party response notification function uses an API unique to the private branch exchanger, a new processing function must be added at the cloud PBX side to convert the private branch exchanger's API into chat message(s), which entails a risk of having to modify the existing cloud PBX.

It is a main objective of the present invention to provide a gateway apparatus, a private branch exchange system, and a private branch exchange method contributing to improving convenience by enabling the others party response notification function of a private branch exchanger to be also used in a cloud PBX without modifying the cloud PBX.

A gateway apparatus according to the first aspect, provided on a communication path between a private branch exchanger and a cloud PBX, wherein the private branch exchanger has a function of performing other party response notification to a subordinate terminal when a representative incoming call is made in response to a call made from an external telephone, and wherein the cloud PBX has a function of virtually performing private branch exchange for a subordinate terminal on a cloud, wherein the gateway apparatus comprises:

- a parameter analysis part configured to receive and analyze response parameter(s) related to the other party response notification from the private branch exchanger via a first API;
- a message generation part configured to generate a message based on an analysis result of the parameter analysis part; and
- a message transmission part configured to transmit the message generated by the message generation part to the cloud PBX via a second API different from the first API.

A private branch exchange system according to the second aspect, comprising:

- a private branch exchanger comprising a function of performing the other party response notification to a subordinate terminal when making a representative incoming call in response to a call made from an external telephone;
- a cloud PBX having a function of virtually performing private branch exchange for subordinate terminals on the cloud; and the gateway apparatus according to the first aspect.

A private branch exchange method according to the third aspect, that performs private branch exchange by utilizing a gateway apparatus provided on a communication path between a private branch exchanger and a cloud PBX, wherein the private branch exchanger has a function of performing other party response notification to a subordinate terminal when a representative incoming call is made in response to a call made from an external telephone, and wherein the cloud PBX has a function of virtually performing private branch exchange for a subordinate terminal on a cloud, wherein the private branch exchange method comprises:

receiving, in the gateway apparatus, to analyze response parameter(s) related to the other party response notification from the private branch exchanger via a first API;

generating, in the gateway apparatus, a message based on an analysis result of the response parameter(s); and transmitting, in the gateway apparatus, the generated message to the cloud PBX via a second API different from the first API.

According to the first to third aspect, it is possible to contribute to improving convenience by enabling the other party response notification function of a private branch exchanger to be also used in a cloud PBX without modifying the cloud PBX.

BRIEF DESCRIPTION OF DRAWINGS

FIG. 3 is an example of a display on a fixed telephone under a private branch exchange in the private branch exchange system according to the example embodiment 1.

FIG. 4 is a table schematically showing an example of a configuration of a database of a gateway apparatus in a private branch exchange system according to the example embodiment 1.

EXAMPLE EMBODIMENTS

Figure 1:
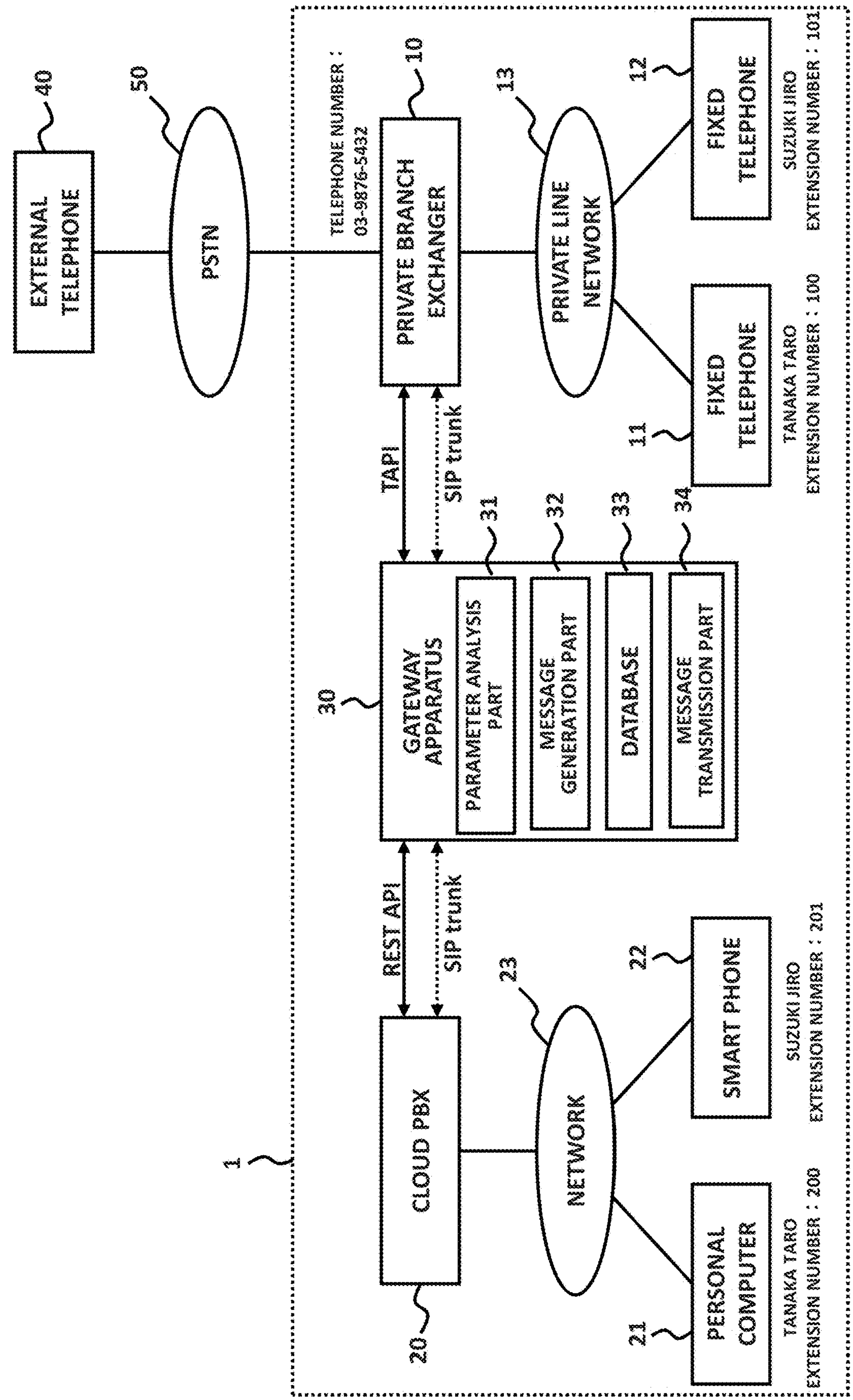
FIG. 1 is a block diagram schematically showing a configuration of a private branch exchange system according to an example embodiment 1.

Hereinafter, a description will be made with reference to the drawings regarding example embodiments. Note that, when reference symbols are used in this description, they are intended to facilitate understanding only and are not intended to limit the scope of the invention to the illustrated modes. Further, the following example embodiments are merely examples and do not limit the present invention. Furthermore, the connection lines between blocks in the drawings and the like referred to in the following description include both bidirectional and unidirectional lines. Unidirectional arrows are used to diagrammatically indicate the flow of the main signal (data) and do not exclude bidirectionality. Furthermore, in the circuit diagrams, block diagrams, internal configuration diagrams, connection diagrams, etc. shown in this disclosure, although not explicitly shown, input ports and output ports exist at the input and output ends of each connection lines. The same applies to input/output interfaces. The program can be recorded on a computer-readable storage medium. The storage medium can be a non-transitory medium such as a semiconductor memory, a hard disk, a magnetic recording medium, or an optical recording medium. The program can be input to the computer apparatus from an input apparatus or an external apparatus through a communication interface, stored in a storage apparatus, and drive the processor according to specified step or process. The program can display the processing results, including intermediate states as necessary, for each stage through a display apparatus, or can communicate with apparatus inside or external the apparatus (including computers) through the communication interface, irrespective of wired or wireless. A computer apparatus for this purpose, for example, typically includes a processor, a storage apparatus, an input apparatus, a communication interface, and, if necessary, a display apparatus, all of which can be connected to one an other through a bus.

Example Embodiment 1

Figure 2:
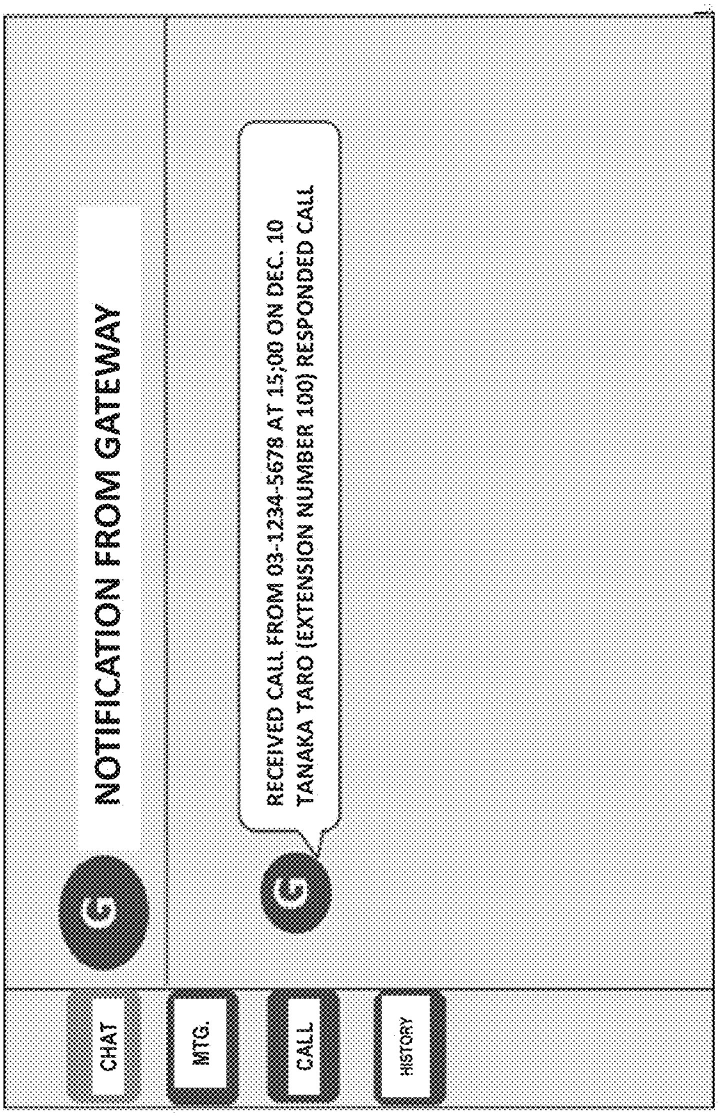
FIG. 2 is an example of a display on a personal computer or a smartphone subordinate of a cloud PBX in a private branch exchange system according to the example embodiment 1.

A description will be made with reference to the drawings regarding a private branch exchange system according to an example embodiment 1. FIG. 1 is a block diagram schematically showing a configuration of a private branch exchange system according to the example embodiment 1. FIG. 2 is an example of a display on a personal computer or smartphone subordinate of a cloud PBX in a private branch exchange system according to the example embodiment 1. FIG. 3 is an example of a display on a fixed telephone subordinate of a private branch exchanger in the private branch exchange system according to the example embodiment 1. FIG. 4 is a table schematically showing an example of a configuration of a database of a gateway apparatus in the private branch exchange system according to the example embodiment 1.

The private branch exchange system 1 is a system (hybrid system) configured such that a private branch exchanger 10 and a cloud PBX 20 operate as one private branch exchanger (refer to FIG. 1). The private branch exchange system 1 is connected communicatively (wired communication, wireless communication) to an external telephone 40 through a public switched telephone network 50 at the private branch exchanger 10. The private branch exchange system 1 comprises the private branch exchanger 10, fixed telephones 11 and 12, a private line network 13, the cloud PBX 20, a personal computer 21, a smartphone 22, a network 23, and a gateway apparatus 30. In the example of FIG. 1, there is one external telephone 40, but there may be two or more, or it may be an other type of terminal having a telephone function. In the example of FIG. 1, there are two fixed telephones 11 and 12 subordinate of the private branch exchanger 10, but there may be one or more. Further, in the example of FIG. 1, the terminals subordinate of the cloud PBX 20 are a personal computer 21 and a smartphone 22, but they may be also other types of terminals (for example, tablet terminals), and there may be one or more.

The private branch exchanger 10 is a telephone exchanger installed in a private premises (refer to FIG. 1). The private branch exchanger 10 is communicatively connected to fixed telephones 11 and 12 through a private line network 13. The private branch exchanger 10 is communicatively connected to the external telephone 40 (external telephone line) through the public switched telephone network 50 (PSTN). The private branch exchanger 10 is capable of making and receiving external calls. In the example of FIG. 1, the telephone number (external telephone number) "03-9876-5432" is set to the private branch exchanger 10. The private branch exchanger 10 has interfaces for TAPI and SIP (Session Initiation Protocol). The private branch exchanger 10 is communicatively connected to the cloud PBX 20 through a gateway apparatus 30 via SIP, and when the private branch exchanger 10 makes a representative incoming call (receives a call to a representative number from the external telephone 40), it calls the fixed telephones 11 and 12 subordinate of the private branch exchanger 10, and also calls the personal computer 21 and the smartphone 22 subordinate of the cloud PBX 20 through the gateway apparatus 30 via SIP. The private branch exchanger 10 has a time function and a function of acquiring the date and time when the representative incoming call is made (or when a call is responded). The private branch exchanger 10 has a function of acquiring the caller number (the telephone number of the external telephone 40 in the example of FIG. 1) when the representative incoming call is received. The private branch exchanger 10 has a function of detecting whether or not a call is responded by a representative incoming call. The private branch exchanger 10 has a function of acquiring the extension number of the terminal that responded the call (any one of the fixed telephones 11 and 12, the personal computer 21, and the smartphone 22) when the call is responded by the representative incoming call. When the representative incoming call is responded or not responded, the private branch exchanger 10 collects specified data regarding receipt or non-receipt of the response to generate an other party response notification (incoming call history at the fixed telephones 11 and 12), and to transmit the generated other party response notification to the fixed telephones 11 and 12. Here, the data included in the other party response notification may be the date and time, the caller's number, and the response status (responded, not response). When the representative incoming call is responded or not responded, the private branch exchanger 10 collects specified data to generate response parameter(s) (related to the other party response notification), and to transmit the generated response parameter(s) to the gateway apparatus 30 via TAPI. Here, the data included in the response parameter(s) may be, for example, the date and time, the caller's number, the response status (responded and extension number of the terminal that responded, not responded), and the extension number (personal computer 21, smartphone 22).

The fixed telephones 11 and 12 are telephones installed at specified positions within the premises (refer to FIG. 1). The fixed telephones 11 and 12 may be telephones equipped with, for example, a microphone, a speaker, a control part, a communication part, an operation part, and a display part. The fixed telephones 11 and 12 are communicatively connected to the private branch exchanger 10 through the private line network 13. The fixed telephones 11 and 12 are provided with an external call function of enabling a call made to the external telephone 40 (external telephone) through the private line network 13, the private branch exchanger 10, and the public switched telephone network 50. The fixed telephones 11 and 12 are provided with an internal call function of enabling a call made through the private line network 13 and the private branch exchanger 10. The fixed telephones 11 and 12 display the incoming call history based on the other party response notification from the private branch exchanger 10 (refer to FIG. 3). In the example of FIG. 1, the extension number "100" is set to the fixed telephone 11, and the extension number "101" is set to the fixed telephone 12. The private line network 13 is communicatively connected to he fixed telephones 11 and 12.

The cloud PBX 20 is a server apparatus comprising the function of virtually performing private branch exchange on the cloud for subordinate terminals (personal computer 21 and smartphone 22 in FIG. 1) (refer to FIG. 1). The cloud PBX 20 may also be installed in the premises where private branch exchanger 10 is installed. The cloud PBX 20 may use, for example, a server apparatus configuring a computer including a processor, memory, a network interface, etc. The cloud PBX 20 executes specified processing by executing a program in the processor while utilizing the memory. The cloud PBX 20 is communicatively connected to the personal computer 21 and the smartphone 22 subordinate thereto through the network 23. The cloud PBX 20 has a REST API and a SIP interface. The cloud PBX 20 is communicatively connected to the private branch exchanger 10 through the gateway apparatus 30 via SIP, and when the representative incoming call is made at the private branch exchanger 10, the cloud PBX 20 calls the personal computer 21 and smartphone 22 subordinate of the cloud PBX 20 in response to the call to the private branch exchanger 10 through the gateway apparatus 30 via SIP. The cloud PBX 20 receives chat message(s) (generated by the gateway apparatus 30 based on the response parameter(s)) transmitted from the gateway apparatus 30 via the REST API, and transmits the received chat message(s) to subordinate personal computers 21 and smartphones 22.

The personal computer 21 is an information communication terminal used by a user (refer to FIG. 1). The smartphone 22 is an information communication terminal carried by a user (refer to FIG. 1). The personal computer 21 and the smartphone 22 are communicatively connected to the cloud PBX 20 through the network 23. The personal computer 21 and the smartphone 22 comprise functional parts constituting a computer (for example, a processor, a storage apparatus, an input apparatus, a communication interface, and a display apparatus), and may be terminals (computer terminals) comprising (or connected to) functional parts necessary for calls (microphone, speaker, etc.). The personal computer 21 and smartphone 22 have an external call function of enabling calls with the external telephone 40 through the network 23, the cloud PBX 20, the gateway apparatus 30, the private branch exchanger 10, and the public switched telephone network 50. The personal computer 21 and the smartphone 22 have an internal call function that enables calls to be made through the network 23 and the smartphone 22. The personal computer 21 and smartphone 22 display chat message(s) from the cloud PBX 20 (refer to FIG. 2). In the example of FIG. 1, an extension number "200" is set to the personal computer 21, and an extension number "201" is set to the smartphone 22. In addition, here, the both of the personal computer 21 (extension number: 200) and the fixed telephone 11 (extension number: 100)'s user is "TANAKA Taro", and both of the smartphone 22 (extension number: 201) and the fixed telephone 12 (extension number: 101)'s user is "SUZUKI Jiro" (refer to FIG. 4). The network 23 is a communication network performing communications between the cloud PBX 20, the personal computer 21, and the smartphone 22 (refer to FIG. 1). The network 23 may be, for example, a communication network such as a LAN (Local Area Network), a PAN (Personal Area Network), a MAN (Metropolitan Area Network), a WAN (Wide Area Network), or a GAN (Global Area Network), etc.

The gateway apparatus 30 is an apparatus serving as a relay apparatus for communicatively connecting the private branch exchanger 10 and the cloud PBX 20 each having communication protocol different from each other (refer to FIG. 1). The gateway apparatus 30 may also be installed in the premises where the private branch exchanger 10 is installed. The gateway apparatus 30 comprises a function of enabling a function of the private branch exchanger 10 (other party response notification function) used only by the fixed telephones 11 and 12 subordinate of the private branch exchanger 10 to be also used by terminals subordinate of the cloud PBX 20 (personal computer 21, smartphone 22). The gateway apparatus 30 is provided on the communication path between the private branch exchanger 10 and the cloud PBX 20. The gateway apparatus 30 communicates with the private branch exchanger 10 using SIP and TAPI. The gateway apparatus 30 has interfaces for TAPI, REST API, and SIP. The gateway apparatus 30 communicates between the fixed telephones 11 and 12 subordinate of the private branch exchanger 10 and the terminals subordinate of the cloud PBX 20 (personal computer 21, smartphone 22) via SIP. The gateway apparatus 30 receives response parameter (s) in TAPI data format (including data on the other party response notification) from the private branch exchanger 10 via TAPI and analyzes the received response parameter(s) to generate chat message(s) in REST API data format, and transmits the generated chat message(s) to the cloud PBX 20 via the REST API. Thereby the other party response notification of the private branch exchanger 10 can be notified as chat message(s) to the terminals (personal computers 21, smartphones 22) subordinate of the cloud PBX 20. For example, a server apparatus comprising a computer including a processor, a memory, a network interface, etc. can be used as the gateway apparatus 30. The gateway apparatus 30 can be virtually configured to comprise a parameter analysis part 31, a message generation part 32, a database 33, and a message transmission part 34 (refer to FIG. 1) by executing a program in the processor utilizing the memory.

The parameter analysis part 31 is a functional part receiving and analyzing response parameter(s) from the private branch exchanger 10 via TAPI (first API) (refer to FIG. 1). The parameter analysis part 31 converts the response parameter(s) in TAPI data format into REST API (second API) data format to extract data from the response parameter(s) (date and time, caller number, response status (responded, not responded), extension number). The extension number is the destination extension number and may be one or plural.

The message generation part 32 is a functional part generating chat message(s) based on the analysis result (corresponding to the extracted data) by the parameter analysis part 31 (refer to FIG. 1). When the extension number of the responding terminal is extracted by the parameter analysis part 31, the message generation part 32 acquires the user-name corresponding to the extension number from the database 33 (refer to FIG. 4). Note that, the acquisition of the user-name is to clarify the user-name whose fixed telephone responded, therefor the acquisition of the user-name may be omitted. In addition, a mail address is acquired from the extension number to be used as the destination address. The message generation part 32 generates chat message(s) in REST API data format based on the data extracted by the parameter analysis part 31, the acquired user-name and the mail address. When any extension number is extracted by the parameter analysis part 31, the message generation part 32 generates chat message(s) in REST API data format based on the data extracted by the parameter analysis part 31 (date and time, caller number, response status (responded, not responded), extension number).

The database 33 is a database in which corresponding extension numbers, user-names, and mail addresses are organized in association with each other (refer to FIGS. 1 and 4).

The message transmission part 34 is a functional part transmitting chat message(s) in REST API data format generated by the message generation part 32 to the cloud PBX 20 via the REST API (refer to FIG. 1).

Note that, in FIG. 1, the external telephone 40 is used by user A and is capable of making external calls. The external telephone 40 may also be any types of terminals other than a telephone (for example, a smartphone, a tablet terminal, etc.). The telephone number (external telephone) "03-1234-5678" is set to the external telephone 40. The public switched telephone network 50 is a line network shared and used by an unspecified number of users (public). The public switched telephone network 50 communicatively connects the external telephone 40 and the private branch exchanger 10.

Figure 5:
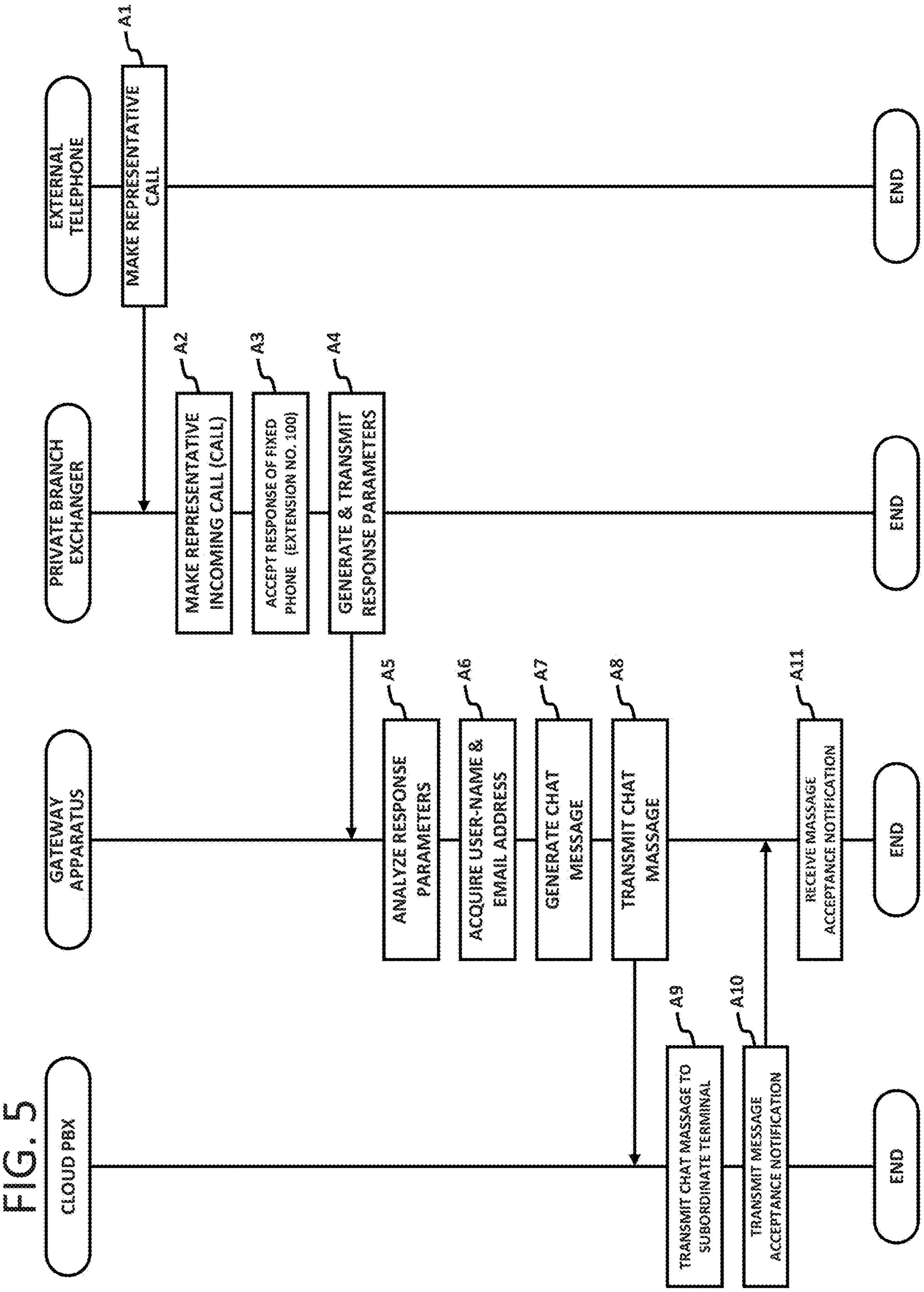
FIG. 5 is a sequence diagram schematically showing an operation of a private branch exchange system according to the first example embodiment.
Figure 6:
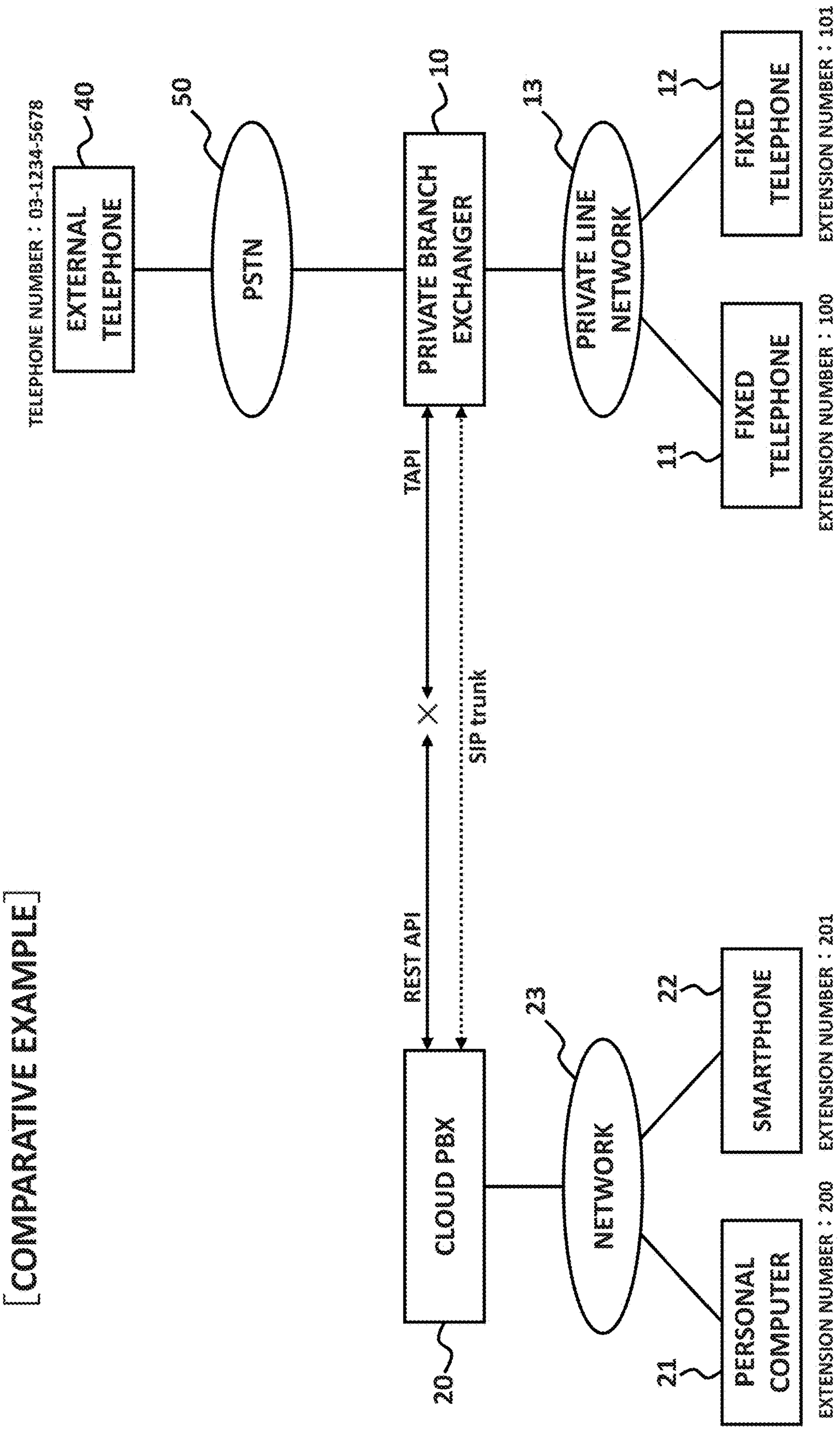
FIG. 6 is a block diagram showing a schematic configuration of a private branch exchange system according to a comparative example.

Next, a description will be made with reference to the drawings regarding an operation of the private branch exchange system according to the first example embodiment. FIG. 5 is a sequence diagram schematically showing an operation of a private branch exchange system according to the first example embodiment. Note that, FIG. 1 should be referred to for a configuration of the private branch exchange system.

First, the external telephone 40 makes a call in response to operations of user A to a main number (telephone number: 03-9876-5432) of the private branch exchanger 10 (step A1). Thereby the external telephone 40 accesses the private branch exchanger 10 through a telephone exchanger (not shown) in the public switched telephone network 50. When making a call, the external telephone 40 also transmits its own telephone number (03-1234-5678) as a caller number.

Next, the private branch exchanger 10 makes the representative incoming call in response to the call from the external telephone 40, calls the fixed telephones 11 and 12 subordinate of the private branch exchanger 10, and also calls the personal computer 21 and smartphone 22 subordinate of the cloud PBX 20 through the gateway apparatus 30 via SIP (step A2). Thereby the fixed telephones 11 and 12, the personal computer 21, and the smartphone 22 make incoming ring. Hereinafter, in FIG. 5, it is assumed that the fixed telephone 11 (TANAKA Taro, extension number: 100) responded the call.

Next, the private branch exchanger 10 accepts a response from the fixed telephone (extension number: 100) to the call (step A3).

Next, the private branch exchanger 10 collects specified data related to response acceptance (date and time, caller number, response status (here, the response and the extension number of the fixed telephone 11)), and generates response parameter(s) in TAPI data format to transmit the generated response parameter(s) to the gateway apparatus 30 via TAPI (step A4).

Next, the gateway apparatus 30 receives the response parameter(s) from the private branch exchanger 10 to analyze the received response parameter(s) (step A5). In analyzing the response parameter(s), the response parameter(s) in TAPI data format are converted to REST API data format, and the data in the response parameter(s) (date and time, caller number, response status (responded, not responded), extension number) are extracted.

Next, the gateway apparatus 30 acquires the name and the mail address corresponding to the extension number from the database 33 based on the extension number in the extracted data (step A6).

Next, the gateway apparatus 30 generates chat message(s) in REST API data format based on the extracted data and the acquired user-name and mail address (step A7).

Next, the gateway apparatus 30 transmits the generated chat message(s) to the cloud PBX 20 via the REST API (step A8).

Next, the cloud PBX 20 transmits the received chat message(s) to the terminal (personal computer 21, smartphone 22) subordinate of the cloud PBX 20 (step A9). Thereby SUZUKI Jiro who uses the smartphone 22 can verify the chat message(s) on the smartphone 22 to confirm that TANAKA Taro has responded the representative incoming call.

Next, the cloud PBX 20 transmits a message acceptance notification to gateway apparatus 30 notifying that the chat message(s) has been received (step A10).

At last, the gateway apparatus 30 receives the message acceptance notification from the cloud PBX 20 (step A11), and then ends the process.

According to the first example embodiment, since the gateway apparatus 30 is provided on the communication path between the private branch exchanger 10 and the cloud PBX 20, and response parameter(s) related to the private branch exchanger 10's other party response notification are processed (converted), the other party response notification function of the private branch exchanger is also available in the cloud PBX without modifying the cloud PBX to contribute to improving convenience. In other words, since the gateway apparatus 30 absorbs the difference in API between the private branch exchanger 10 and the cloud PBX 20, there is no need to modify neither the private branch exchanger 10 nor the cloud PBX 20. The other party response notification function of the private branch exchanger is available in the cloud PBX while using the APIs of the private branch exchanger 10 and the cloud PBX 20, as they are, to eliminate the risk of modifying the existing system.

Further, according to the example embodiment 1, by sharing the other party response notification from the private branch exchanger 10 also with terminals (personal computers 21, smartphones 22) subordinate of the cloud PBX 20, the users using the terminals (personal computers 21, smartphones 22) subordinate of the cloud PBX 20 can be notified how the representative incoming call is responded, thereby reducing the time to verify the response status.

Example Embodiment 2

Figure 7:
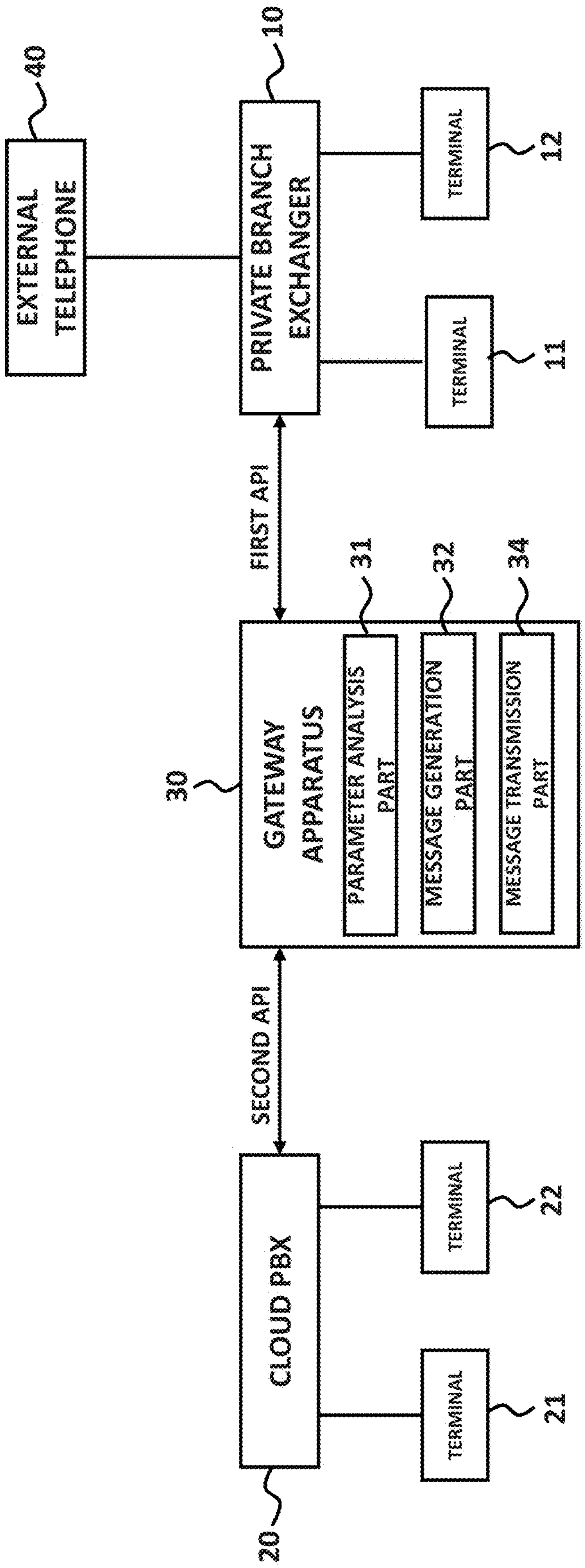
FIG. 7 is a block diagram schematically showing a configuration of a private branch exchange system according to example embodiment 2.

A description will be made with reference to the drawings regarding the private branch exchange system according to an example embodiment 2. FIG. 7 is a block diagram schematically showing a configuration of a private branch exchange system according to the example embodiment 2.

A gateway apparatus 30 is provided on a communication path between a private branch exchanger 10 and a cloud PBX 20. The private branch exchanger 10 has a function of performing other party response notification to subordinate terminals 11 and 12, when a representative incoming call is made in response to a call made from the external telephone 40. The cloud PBX 20 has a function of virtually performing private branch exchange on the cloud for the subordinate terminals 21 and 22.

A gateway apparatus 30 includes a parameter analysis part 31, a message generation part 32, and a message transmission part 34. The parameter analysis part 31 is configured to receive and analyze response parameter(s) related to the other party response notification from the private branch exchanger 10 via a first API. The message generation part 32 is configured to generate messages based on the analysis result of the parameter analysis part 31. The message transmission part 34 is configured to transmit the messages generated by the message generation part 32 to the cloud PBX 20 via a second API (API different from the first API).

According to the example embodiment 2, since the gateway apparatus 30 is provided on the communication path between the private branch exchanger 10 and the cloud PBX 20, and response parameter(s) related to the private branch exchanger 10's other party response notification are processed (converted) to be used by the cloud PBX 20, it is possible to use the private branch exchanger's other response notification function in the cloud PBX without modifying the cloud PBX, thereby contributing to increasing convenience.

Figure 8:
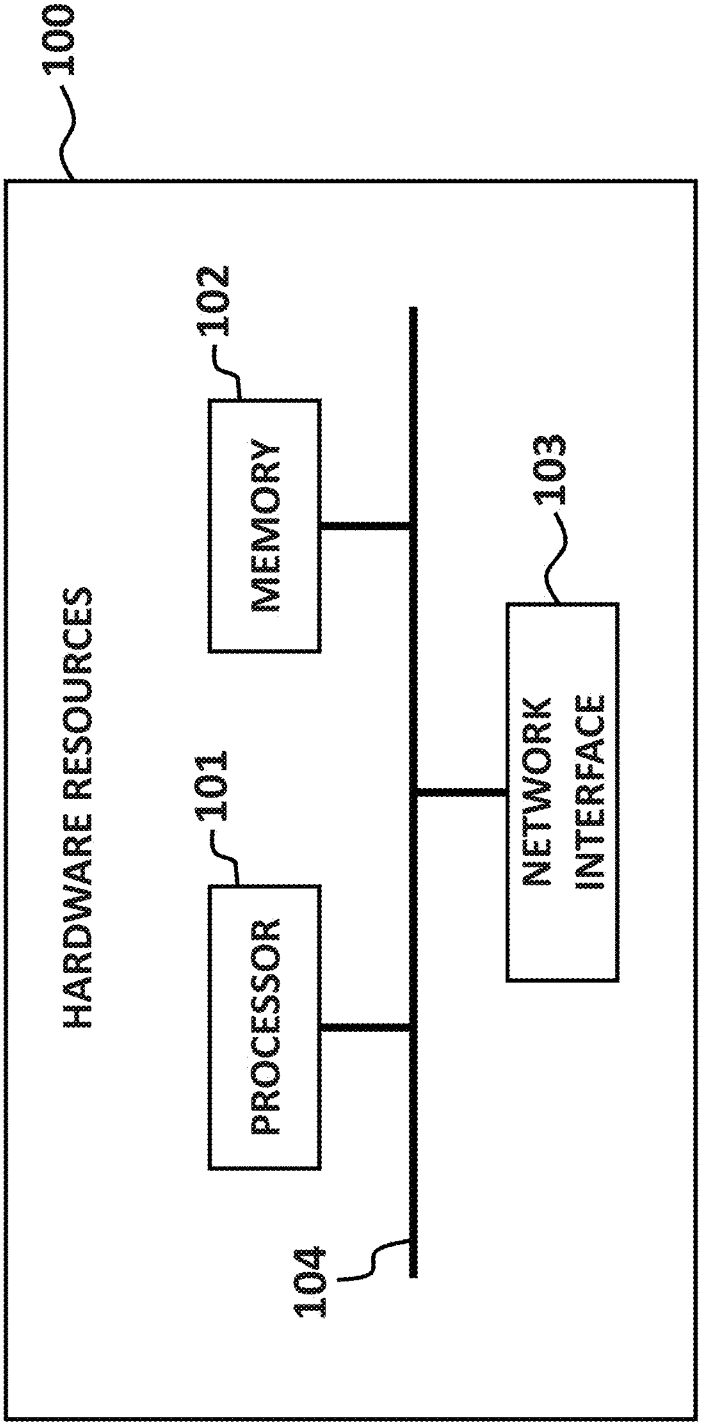
FIG. 8 is a block diagram showing an example configuration of hardware resources.

The gateway apparatus according to the first and second example embodiments may be configured by so-called hardware resources (information processing apparatus, computer), and can use an apparatus having the configuration shown in FIG. 8. For example, the hardware resources 100 includes a processor 101, a memory 102, a network interface 103, etc. connected to each other by an internal bus 104.

Note that the configuration shown in FIG. 8 is not intended to limit the hardware configuration of the hardware resources 100. The Hardware resources 100 may include hardware (for example, an input/output interface) that is not shown. Or else, the number of units such as the processor 101 included in the apparatus is not limited to the example shown in FIG. 8, and for example, a plurality of processor 101 may be included in the hardware resources 100. The processor 101 may be, for example, a central processing unit (CPU), a microprocessor unit (MPU), a graphics processing unit (GPU), etc.

For example, a random access memory (RAM), a read only memory (ROM), a hard disk drive (HDD), or a solid state drive (SSD), etc. may be used for the memory 102.

For example, a LAN (Local Area Network) card, a network adapter, a network interface card, etc. may be used for the network interface 103, for example, The functions of the hardware resources 100 are implemented by the processing modules described above. For example, the processing modules may be implemented by the processor 101 executing a program stored in the memory 102. Further, the program can be downloaded through a network or updated using a storage medium on which the program is stored. Furthermore, the processing modules may be implemented by semiconductor chips. That is, the functions performed by the processing modules may be implemented by software being executed on some kind of hardware.

A part or all of the above-described example embodiments may be described as, but is not limited to, the following supplementary notes.

Note 1

A gateway apparatus, provided on a communication path between a private branch exchanger and a cloud PBX, wherein the private branch exchanger has a function of performing other party response notification to a subordinate terminal when a representative incoming call is made in response to a call made from an external telephone, and wherein the cloud PBX has a function of virtually performing private branch exchange for a subordinate terminal on a cloud, wherein the gateway apparatus comprises:

a parameter analysis part configured to receive and analyze response parameter(s) related to an other party response notification from the private branch exchanger via a first API;

a message generation part configured to generate a message based on an analysis result of the parameter analysis part; and a message transmission part configured to transmit the message generated by the message generation part to the cloud PBX via a second API different from the first API.

Note 2

The gateway apparatus according to note 1, wherein the parameter analysis part is configured to convert the response parameter(s) in a data format related to the first API into a data format related to the second API, and to extract data in the response parameter(s), and the message generation part is configured to generate the message in the data format related to the second API based on the data extracted by the parameter analysis part as the analysis result.

Note 3

The gateway apparatus according to note 2, wherein the data in the response parameter(s) include a date and time, a caller number, a response status indicating whether the caller is responded or not responded, and an extension number, and include the extension number of the terminal that responded, when the response status indicates responded.

Note 4

The gateway apparatus according to note 3, further comprising a database in which corresponding extension numbers and user-names or mail addresses are organized in association with each other, wherein the message generation part is configured to acquire the user-name or the mail address corresponding to the extracted extension number as the data in the response parameter from the database when the parameter analysis part extracts the extension number, and to generate the message in a data format related to the second API based on the data and the user-name or the mail address.

Note 5

The gateway apparatus according to note 3, wherein the message generation part is configured to generate the message in the data format related to the second API based on the data not including the extension number when no extension number is extracted as the data in the response parameter by the parameter analysis part.

Note 6

The gateway apparatus according to any one of notes 1 to 5, wherein the first API is a TAPI, and the second API is a REST API.

Note 7

A private branch exchange system, comprising:

a private branch exchanger comprising a function of performing the other party response notification to a subordinate terminal when making a representative incoming call in response to a call made from an external telephone;

a cloud PBX having a function of virtually performing private branch exchange for subordinate terminals on the cloud; and the gateway apparatus according to any one of notes 1 to 5.

Note 8

The private branch exchange system according to note 7, wherein the private branch exchanger is configured to collect specified data and generate response parameter (s) related to the other party response notification when the representative incoming call is responded or not responded, and to transmit the response parameter(s) to the gateway apparatus via the first API, and the cloud PBX is configured to receive the message from the gateway apparatus to transmit the message to the terminals subordinate of the cloud PBX.

Note 9

The private branch exchange system according to note 7, wherein the private branch exchanger is communicatively connected to the cloud PBX through the gateway apparatus via SIP, and by making the representative incoming call, the terminal subordinate of the private branch exchanger is called, and a terminal subordinate of the cloud PBX is called through the gateway apparatus via SIP.

Note 10

A private branch exchange method that performs private branch exchange by utilizing a gateway apparatus provided on a communication path between a private branch exchanger and a cloud PBX, wherein the private branch exchanger has a function of performing other party response notification to a subordinate terminal when a representative incoming call is made in response to a call made from an external telephone, and wherein the cloud PBX has a function of virtually performing private branch exchange for a subordinate terminal on a cloud, wherein the private branch exchange method comprises:

receiving, in the gateway apparatus, to analyze response parameter(s) related to the other party response notification from the private branch exchanger via a first API;

generating, in the gateway apparatus, a message based on an analysis result of the response parameter(s); and transmitting, in the gateway apparatus, the generated message to the cloud PBX via a second API different from the first API.

The disclosures of the above PTL are incorporated herein by reference and may be used as the basis or part of the present invention as necessary. Within the scope of the entire disclosure of the present invention (including the claims and drawings), and further based on the basic technical ideas, the example embodiments and examples can be modified and adjusted. In addition, various combinations or selections (or non-selection, if necessary) of various disclosed elements (including each element of each claim, each element of each example embodiment or example, each element of each drawing, etc.) are possible within the framework of the entire disclosure of the present invention. That is, the present invention includes various modifications and alterations that a person skilled in the art would make based on the entire disclosure, including the claims and drawings, and the technical ideas. In addition, the numerical values and numerical ranges described in this application are considered to include any intermediate values, lower numerical values, and small ranges even if not explicitly recited. Furthermore, the disclosures of the above cited documents, when used in part or in whole in combination with the descriptions in this document as part of the disclosure of the present invention, in accordance with the spirit of the present invention, are also considered to be included in (belong to) the disclosures of this application.

REFERENCE SIGNS LIST

1 Private Branch Exchange system
10 Private Branch Exchanger
11 Fixed Telephone (Terminal)
12 Fixed telephone (Terminal)
13 Private Line Network
20 Cloud PBX
21 Personal computer (Terminal)
22 Smartphone (Terminal)
23 Network
30 Gateway Apparatus
31 Parameter Analysis Part
32 Message Generation Part
33 Database
34 Message Transmission Part
40 External Telephone
50 Public Switched Telephone Network (PSTN)
100 Hardware resources
101 Processor
102 Memory
103 Network Interface
104 Internal Bus

What is claimed is:

1. A gateway apparatus, provided on a communication path between a private branch exchanger and a cloud PBX, wherein the private branch exchanger has a function of performing other party response notification to a subordinate terminal when a representative incoming call is made in response to a call made from an external telephone, and wherein the cloud PBX has a function of virtually performing private branch exchange for a subordinate terminal on a cloud, wherein the gateway apparatus comprises:

a parameter analysis part configured to receive and analyze response parameter(s) related to an other party response notification from the private branch exchanger via a first API;

a message generation part configured to generate a message based on an analysis result of the parameter analysis part; and a message transmission part configured to transmit the message generated by the message generation part to the cloud PBX via a second API different from the first API.

2. The gateway apparatus according to claim 1, wherein the parameter analysis part is configured to convert the response parameter(s) in a data format related to the first API into a data format related to the second API, and to extract data in the response parameter(s), and the message generation part is configured to generate the message in the data format related to the second API based on the data extracted by the parameter analysis part as the analysis result.

3. The gateway apparatus according to claim 2, wherein the data in the response parameter(s) include a date and time, a caller number, a response status indicating whether the caller is responded or not responded, and an extension number of a destination of the message, and include the extension number of the terminal that responded in the response status, when the response status indicates responded.

4. The gateway apparatus according to claim 3, further comprising a database in which corresponding extension numbers and user-names or mail addresses are organized in association with each other, wherein the message generation part is configured to acquire the user-name or the mail address corresponding to the extracted extension number as the data in the response parameter from the database when the extension number of the terminal that responded is extracted by the parameter analysis part, and to generate the message in a data format related to the second API based on the data and the user-name or the mail address.

5. The gateway apparatus according to claim 3, wherein the message generation part is configured to generate the message in the data format related to the second API based on the data not including the extension number when no extension number of the terminal that responded is extracted as the data in the response parameter by the parameter analysis part.

6. The gateway apparatus according to claim 1, wherein the first API is a TAPI, and the second API is a REST API.

7. A private branch exchange system, comprising:

a private branch exchanger comprising a function of performing the other party response notification to a subordinate terminal when making a representative incoming call in response to a call made from an external telephone;

a cloud PBX having a function of virtually performing private branch exchange for subordinate terminals on the cloud; and the gateway apparatus according to claim 1.

8. The private branch exchange system according to claim 7, wherein the private branch exchanger is configured to collect specified data and generate response parameter(s) related to the other party response notification when the representative incoming call is responded or not responded, and to transmit the response parameter(s) to the gateway apparatus via the first API, and the cloud PBX is configured to receive the message from the gateway apparatus to transmit the message to the terminals subordinate of the cloud PBX.

9. The private branch exchange system according to claim 7, wherein the private branch exchanger is communicatively connected to the cloud PBX through the gateway apparatus via SIP, and by making the representative incoming call, the terminal subordinate of the private branch exchanger is called, and a terminal subordinate of the cloud PBX is called through the gateway apparatus via SIP.

10. A private branch exchange method that performs private branch exchange by utilizing a gateway apparatus provided on a communication path between a private branch exchanger and a cloud PBX, wherein the private branch exchanger has a function of performing other party response notification to a subordinate terminal when a representative incoming call is made in response to a call made from an external telephone, wherein the cloud PBX has a function of virtually performing private branch exchange for a subordinate terminal on a cloud, and wherein the private branch exchange method comprises:

receiving, in the gateway apparatus, to analyze response parameter(s) related to the other party response notification from the private branch exchanger via a first API;

generating, in the gateway apparatus, a message based on an analysis result of the response parameter(s); and transmitting, in the gateway apparatus, the generated message to the cloud PBX via a second API different from the first API.

11. The private branch exchange method according to claim 10, further comprising:

for analyzing the response parameter(s), converting the response parameter(s) in a data format related to the first API into a data format related to the second API, and to extract data in the response parameter(s); and wherein the message in the data format related to the second API is generated based on the data extracted as the analysis result.

12. The private branch exchange method according to claim 11, wherein the data in the response parameter(s) include a date and time, a caller number, a response status indicating whether the caller is responded or not responded, and an extension number of a destination of the message, and include the extension number of the terminal that responded in the response status, when the response status indicates responded.

13. The private branch exchange method according to claim 12, further comprising corresponding extension numbers and user-names or mail addresses organized in association with each other in a database; and for generating the message, acquiring the user-name or the mail address corresponding to the extracted extension number as the data in the response parameter from the database when the extension number of the terminal that responded is extracted by the analysis, and to generate the message in a data format related to the second API based on the data and the user-name or the mail address.

* * * * *